June 14, 1932.  G. W. VOLZ  1,862,873
COMPOUND VALVE MOTION FOR STEAM PUMPING ENGINES
Filed July 7, 1931  3 Sheets-Sheet 1

INVENTOR
Gottlieb W. Volz
BY
Westall and Wallace
ATTORNEYS

June 14, 1932.  G. W. VOLZ  1,862,873
COMPOUND VALVE MOTION FOR STEAM PUMPING ENGINES
Filed July 7, 1931  3 Sheets-Sheet 2
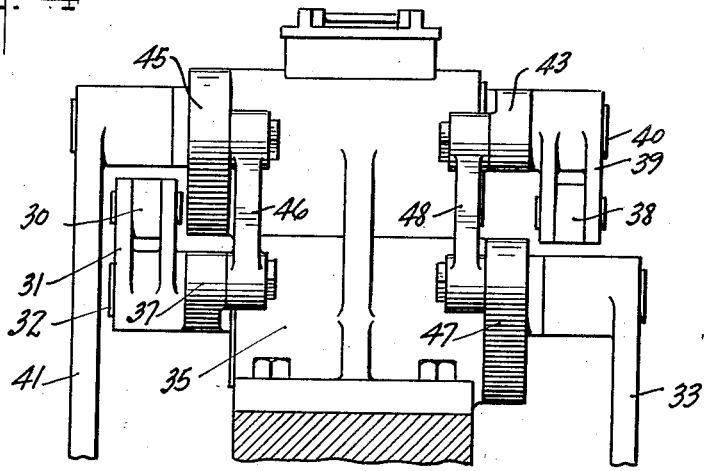
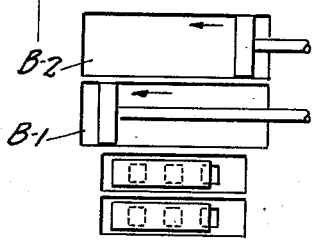
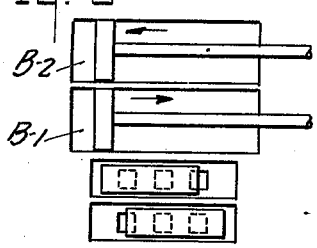
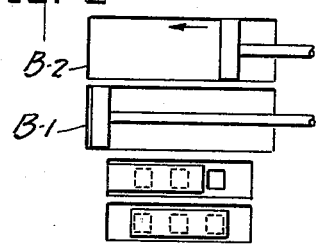
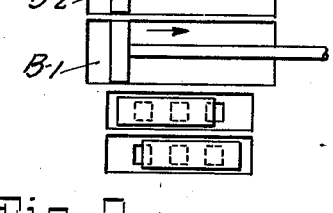
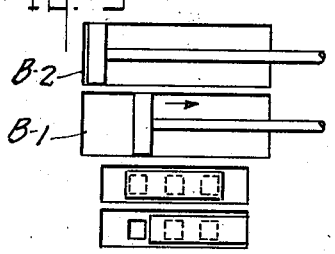
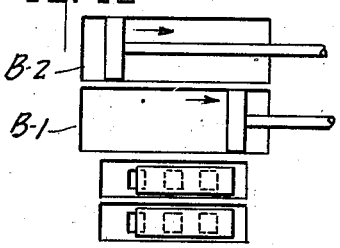
INVENTOR
Gottlieb W. Volz
BY
Westall and Wallace
ATTORNEYS

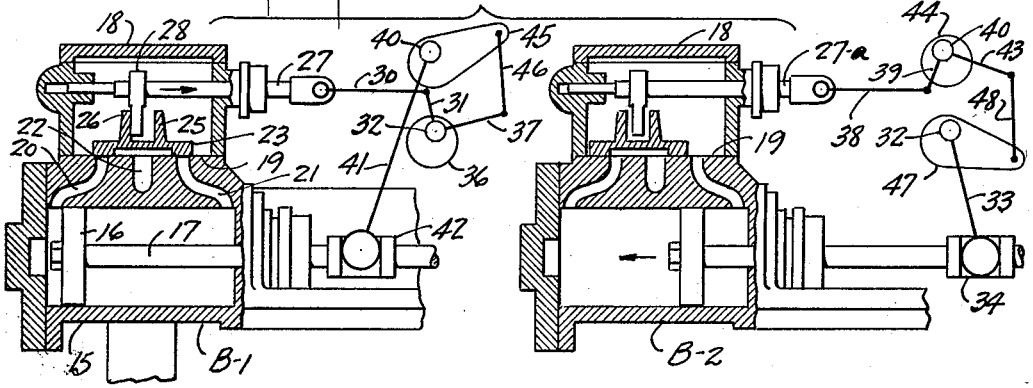
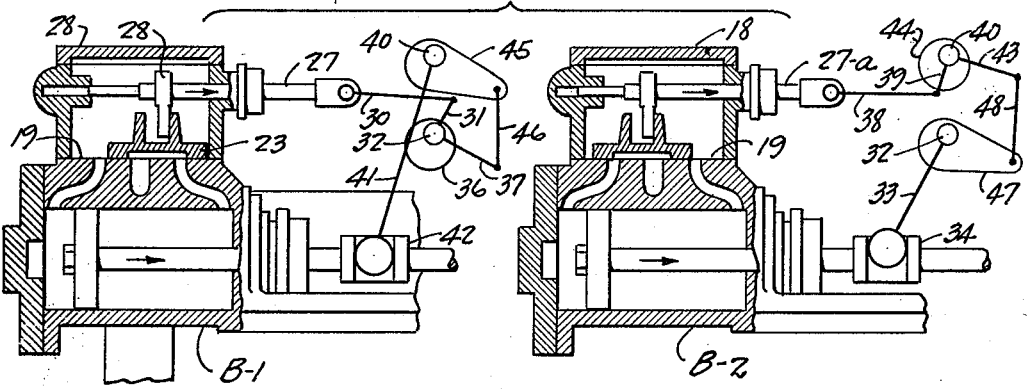
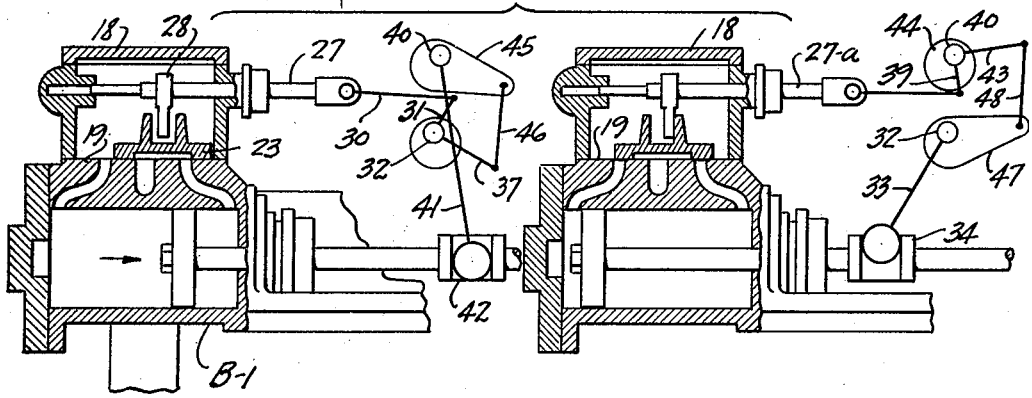

Patented June 14, 1932

1,862,873

UNITED STATES PATENT OFFICE

GOTTLIEB W. VOLZ, OF LONG BEACH, CALIFORNIA

COMPOUND VALVE MOTION FOR STEAM PUMPING ENGINES

Application filed July 7, 1931. Serial No. 549,147.

This invention relates to a duplex steam pump which delivers a non-intermittent flow of liquid, and pertains particularly to a valve motion for causing functioning of the pump in such manner.

Standard types of duplex pumps, due to their intermittent delivery of liquid are wasteful of steam. Pulsation causes racking of the pipes and fittings and quickly pounds the valve seats to a leaky condition. Air chambers have been currently installed in the delivery line to diminish pulsation, but these do not remedy pulsation in the pump itself.

The present invention has for its primary object the provision of a duplex pump which delivers a continuous flow from the liquid end. This is accomplished by causing the pump pistons to overlap in their travel at the ends and beginnings of their strokes. The object of this invention is to provide a valve motion including a lost motion wherein each valve is moved by the action of both pistons to advance a lost motion toward valve opening position for the next stroke, while the companion pump is traveling its working stroke, and to provide specific details of structure to accomplish these objects.

These objects are obtained by means of the embodiment of my invention illustrated in the accompanying drawings in which:—

Figure 1:
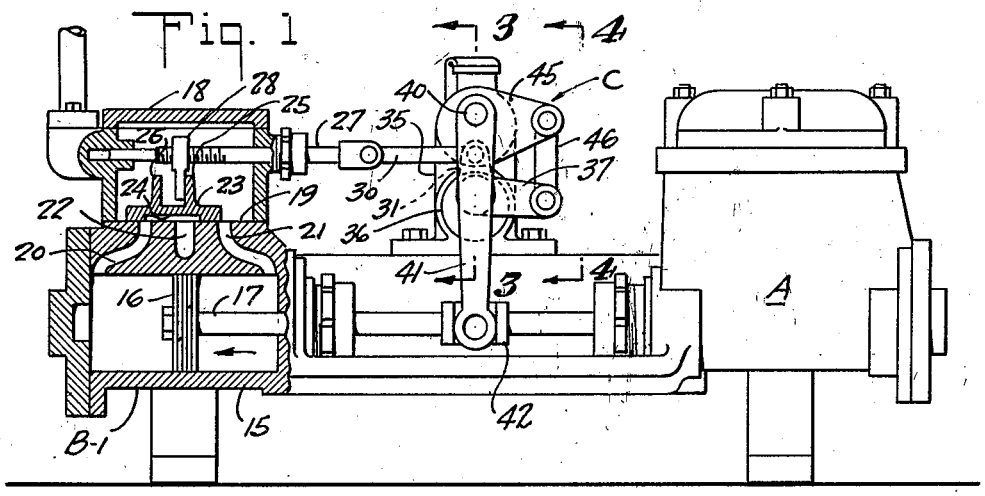
Figures 2, 3:
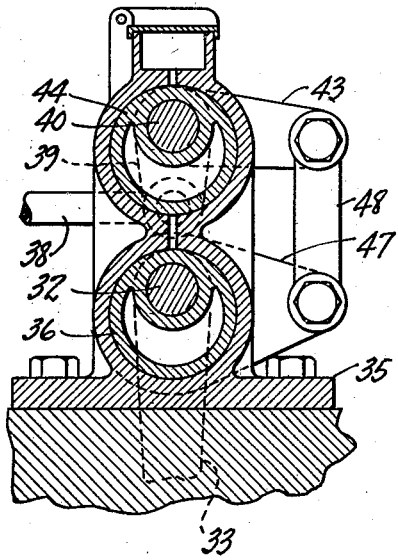

Fig. 1 is a side elevation with the steam end in section of a complete pump; Fig. 2 is a vertical section on an enlarged scale of the valve rocker mounting; Fig. 3 is a transverse section through the valve rocker mounting shown in Fig. 2 and as seen on the line 3—3 of Fig. 1; Fig. 4 is an elevation of the valve mounting as seen looking in the direction of the arrows 4—4 of Fig. 1; Figs. 5 to 10 inclusive are diagrammatic views of the steam valves and associated steam cylinders in various travel positions; and Figs. 11, 12, and 13 show pairs of the steam cylinders in various positions of their travel with the valve motion rockers shown schematically.

Referring more particularly to Fig. 1, the pump end A may be of any well known double acting type comprising two pumps side by side with suitable plungers and valves. The specific construction is not pertinent to the present invention, the steam end comprising two steam cylinders with pistons and valves and denoted by B—1 and B—2. The valve motion is indicated generally by C in Fig. 1. Referring more specifically to the steam end, the parts are similar for each member and one will be described in detail.

Steam cylinder 15 has reciprocably mounted therein a piston 16 with a piston rod 17 secured thereto. This rod is connected to the corresponding pump plunger. There is a common steam chest 18 having a valve seat 19. In the seat are steam inlet ports 20 and 21. Between the steam ports is an exhaust port 22. Riding on the valve seat is a slide valve 23 of the D type having an exhaust cavity 24. Upstanding from the valve are spaced tappet abutments 25 and 26. A valve rod 27 has a tappet 28 disposed between the tappet abutments so as to provide a lost motion connection. The valve rod 27 has a link 30 pivotally connected to one end.

The other end of link 30 is connected to a crank arm 31 provided on the end of a shaft 32 and at the other end of shaft 32 is a rocker arm 33. Rocker arm 33 has its lower end received in a slide box 34 fixed to the plunger rod of engine unit B2. A bracket 35 has a bearing in which is mounted a bearing sleeve 36 having an eccentric bearing for companion shaft 32. Thus, if bearing sleeve 36 is rocked and also shaft 32, the resultant motion is a composite of the two. Shaft 32 has a lever arm 37 extending therefrom. Valve rod 27a of the other steam valve has a link 38 connected to a crank arm 39 fixed to shaft 40. At the other end of shaft 40 is a rocker arm 41 received in a box 42 on the plunger of engine unit B1. A lever arm 43 extends from shaft 40. Shaft 40 is mounted in a bearing sleeve 44 journalled in bracket 35 with companion shaft 40 eccentric to the bearing sleeve. Bearing sleeve 44 has an arm 45 connected by a link 46 to lever arm 37 so that bearing sleeve 44 is rocked with shaft 32. Bearing sleeve 36 has an arm 47 connected to arm 43 by a link 48 so as to be rocked with shaft 40.

It will be noted that each valve rod is connected by linkage to both plunger rods so that its movement is effected by two pistons. The arrows in Figs. 1 and 5 to 13 indicate directions of movement. Referring to Fig. 11, the piston of unit B1 is at the outer end of its stroke and stationary. Unit B2 has its piston moving to the left toward the outer end about one third of its stroke. The valve rod tappet 28 in the valve case on the valve rod of unit B1 is resting against the outer valve abutment. Movement of the piston in unit B2 swings the rocker arm 33 outwardly to the left rocking shaft 32, lever arm 31 and moving the valve rod of unit B1 inwardly toward the right. Since the plunger rod of unit B1 is stationary, rocker 41 is stationary, as is shaft 40 and the intermediate linkage connecting it with sleeve 36 so that the latter is stationary. The plunger rod of unit B2 only conveys motion to the valve rod of unit B1 through the rocker shaft, and the tappet 28 thereon is moved inwardly to the right, eventually engaging the inner tappet of the valve controlling unit B1. Thereafter, the valve of unit B1 is opened to admit steam to the outer end of its cylinder and start its piston inwardly to the right. At the beginning of movement of the piston of unit B1 inwardly as shown in Fig. 12, rocker arm 41 is swung outwardly to the right, rocking shaft 40 and through the intermediate linkage rocking sleeve 36 counter clockwise, reversing the movement of valve rod 27 of unit B1 so as to move tappet 28 toward tappet abutment 26 and take up the lost motion in advance for the next stroke. This continues as long as the piston of unit B2 is moving inwardly. The action on valve rod 27a of unit B2 is of a similar character. It will be noted that when one piston is stationary at the end of its stroke, the other has a full steam port opening and that as the other piston travels the tappet of stationary unit is advanced to take up the lost motion for its next stroke, then fully opened as the moving piston reaches the end of its travel. As the stationary piston begins movement, the valve port controlling movement of the other piston begins to close. Figs. 11, 12 and 13 show three successive positions of the steam pistons, valves and linkage. The linkage is so adjusted that one piston at the intermediate part of its stroke starts the valve rod movement for the valve controlling the other piston to take up the lost motion in the movement, advancing the tappet thereof for the next stroke. Near the end of the strokes of one piston, the other piston has started in the opposite direction with an open steam port while the piston nearing the end of its stroke also has its valve fully open, it being closed at the end of its stroke, the other piston having started on its travel.

At the intermediate part of the stroke of one piston the other piston is stationary. There is no period of dwell of both pistons at any one time. By the time one piston has reached the end of its stroke the other is moving full speed. The pump end pistons move correspondingly with a resultant diminution of pulsation in the liquid end as compared with standard duplex pump movements.

Figs. 5 to 10 inclusive, show diagrammatically the positions which the pistons and valves assume at various points of piston travel throughout a stroke. The figures show in succession according to figure number succeeding positions. It will be noted that the lost motion connection between the valve rod and tappets permits a valve to remain fully open for an interval and fully closed for an interval.

What I claim is:—

1. In a duplex pump having reciprocating plungers, a duplex reciprocating fluid actuated motor having piston rods, one connected to each plunger, slide valves for said motor controlling inlet ports thereto; a valve motion including linkage, one for each valve, each linkage including a lost motion connection to a valve, a rock shaft having a lever for operating each valve, a rockable bearing sleeve in which said rock shaft is eccentrically journalled, means connecting said rock shaft to one piston rod whereby to be rocked thereby, means connecting said sleeve to the other piston rod to be rocked thereby; said piston rods thereby producing a composite motion in said valve rods whereby to operate said valves so as to advance the lost motion connection toward valve opening of the pump which is a companion to the pump started on its stroke.

2. In a duplex pump having reciprocating plungers, a duplex reciprocating fluid actuated motor having piston rods for each motor unit, one connected to each plunger, slide valves for said motor controlling inlet ports thereto; a valve motion including linkage, one for each valve, each linkage including lost motion connection to a valve, a rock shaft having a lever for operating a valve, a rockable bearing sleeve in which said rock shaft is eccentrically journalled, means connecting said sleeve to a piston rod whereby to be rocked thereby, means connecting said rock shaft to the other piston rod whereby to be rocked thereby, each rock shaft being connected to a piston rod having its lever connected to the valve controlling the other motor unit, said piston rods thereby producing a composite motion in said valve rods whereby to operate said valves so as to advance the lost motion connection toward valve opening of the pump which is a companion to the pump started on its working stroke.

3. In a duplex pump having reciprocating plungers, a duplex reciprocating fluid actuated motor having piston rods for each motor unit, one connected to each plunger, slide valves for said motor controlling inlet ports thereto; a valve motion including linkage, one for each valve, each linkage including a lost motion connection, a rock shaft having a lever for operating a valve, a companion rockable bearing sleeve in which said rock shaft is eccentrically journalled, a lever on each of said rock shafts connected to the sleeve not companion thereto whereby to be rocked thereby, means connecting each rock shaft to the other piston rod whereby to be rocked thereby, said piston rods thereby producing a composite motion in said valve rods whereby to operate said valves so as to advance the lost motion connection toward valve opening of the pump which is a companion to the pump started on its working stroke.

4. In a duplex pump having reciprocating plungers, a duplex reciprocating fluid actuated motor having piston rods for each motor unit, one connected to each plunger, slide valves for said motor controlling inlet ports thereto; a valve motion including linkage, one for each valve, each linkage including a lost motion connection, a rock shaft having a lever for operating each valve, a companion rockable bearing sleeve in which said rock shaft is eccentrically journalled, a lever on each of said rock shafts connected to a sleeve not companion thereto whereby to be rocked thereby, means connecting each rock shaft to the other piston rod whereby to be rocked thereby, each rock shaft being connected to a piston rod having its lever connected to the valve controlling the other motor unit, said piston rods thereby producing a composite motion in said valve rods whereby to operate said valves so as to advance the lost motion connection toward valve opening of the pump which is a companion to the pump started on its working stroke.

5. In a duplex pump having reciprocating plungers, a duplex reciprocating fluid actuated motor having piston rods for each motor unit, one connected to each plunger, slide valves for said motor controlling inlet ports thereto; a stationary support valve motion including a pair of bearing sleeves journalled in said support, rock shafts eccentrically journalled in said bearing sleeves, levers on said rock shafts, lost motions connecting said levers to said slide valves, rocker arms on said rock shafts connected to said piston rods, whereby to be rocked thereby, levers connecting said rock shaft to the sleeves other than that in which they are journalled whereby to be rocked thereby, each rock shaft being connected to a piston rod having its lever connected to the valve controlling the other motor unit, said piston rods thereby producing a composite motion in said valve rods whereby to operate said valves so as to advance the lost motion connection toward valve opening of the pump which is a companion to the pump started on its working stroke.

6. In a duplex pump having reciprocating plungers, a duplex reciprocating fluid actuated motor having piston rods, one connected to each plunger, slide valves for said motor controlling inlet ports thereto; a stationary bracket, a valve motion including a pair of bearing sleeves journalled in said bracket side by side, rock shafts eccentrically journalled in said sleeves, levers on said rock shafts disposed at opposite ends, lost motions connecting each lever to a valve disposed on its side, rocker arms at the other ends of said shafts, each rocker arm being connected to a piston rod, a lever on each of said rock shafts connecting the latter to the other bearing sleeve than the one in which it is journalled thereby producing a composite motion whereby to operate said valves so as to advance the lost motion connection toward valve opening of the pump which is a companion to the pump started on its working stroke.

In witness that I claim the foregoing I have hereunto subscribed my name this 29th day of June, 1931.

GOTTLIEB W. VOLZ.